United States Patent [19]

Nagano

[11] Patent Number: 5,095,768
[45] Date of Patent: Mar. 17, 1992

[54] SPEED CONTROL APPARATUS FOR A BICYCLE

[75] Inventor: Masashi Nagano, Izumi, Japan
[73] Assignee: Shimano Corporation, Osaka, Japan
[21] Appl. No.: 508,604
[22] Filed: Apr. 11, 1990
[30] Foreign Application Priority Data Apr. 11, 1989 [JP] Japan .................... 1-91227

[51] Int. Cl.⁵ .................... G05G 13/00; F16C 1/00
[52] U.S. Cl. .................... 74/475; 74/502.2; 74/489
[58] Field of Search .................... 74/502.2, 475, 142, 74/489

[56] References Cited

U.S. PATENT DOCUMENTS

| | | | |
|---|---|---|---|
| 2,854,852 | 10/1958 | Clark | 74/142 |
| 3,943,794 | 3/1976 | Shimada | 74/489 X |
| 3,972,247 | 8/1976 | Armstrong | 74/489 |
| 4,232,564 | 11/1980 | Yamasaki | 74/475 |
| 4,343,201 | 8/1982 | Shimano | 74/489 X |
| 4,532,825 | 8/1985 | Nagano | 74/502.2 X |
| 4,751,852 | 6/1988 | Nagano | 74/475 X |
| 4,864,885 | 10/1989 | Nagano | 74/142 X |
| 4,885,951 | 12/1989 | Desenclos et al. | 74/502.2 |

FOREIGN PATENT DOCUMENTS

| | | |
|---|---|---|
| 2542373 | 4/1976 | Fed. Rep. of Germany ........ 74/489 |
| 1525468 | 9/1978 | United Kingdom . |
| 2012893 | 8/1979 | United Kingdom . |
| 2169973 | 7/1986 | United Kingdom . |
| 2183796 | 6/1987 | United Kingdom ........... 74/475 |

Primary Examiner—Allan D. Herrmann
Assistant Examiner—Julie Krolikowski
Attorney, Agent, or Firm—Dickstein, Shapiro & Morin

[57] ABSTRACT

A bicycle speed control apparatus according to this invention comprises a wind-up control device including a take-up element for winding a speed control cable, and a position maintaining mechanism for maintaining the take-up element in position. The control device is operable to effect change speed by rotating the take-up element for winding the cable.

The present invention is characterized in that the position maintaining mechanism is operable to maintain the take-up element in a plurality of change speed positions and in overshift positions displaced from the change speed positions in a cable winding direction, respectively. The invention further provides a position maintenance canceling device operable to release the take-up element maintained in position by the position maintaining mechanism, and to limit an amount of rotation of the take-up element in the rewinding direction to one change speed position when the take-up element has been maintained in one overshift position associated therewith, and to a different change speed position in the rewinding direction when the take-up element has been maintained in one change speed position.

11 Claims, 3 Drawing Sheets

SPEED CONTROL APPARATUS FOR A BICYCLE

BACKGROUND OF THE INVENTION

1. Field of the Invention

The present invention relates to a speed control apparatus for a bicycle. More particularly, the invention relates to a speed control apparatus for a bicycle comprising a fixing member, a wind-up control device including a take-up element for winding up a speed control cable, the take-up element being rotatably supported by the fixing member and urged in a cable rewinding direction, and a position maintaining mechanism for maintaining the take-up element in a selected position, wherein the take-up element is rotatable by the control device to wind up the cable against an urging force acting in the rewinding direction.

2. Description of the Prior Art

A bicycle speed control apparatus as noted above is disclosed in Japanese Patent Publication Kokai No. 59-149586, for example. In this prior publication, the position maintaining mechanism includes a friction plate to provide a pressure contact for maintaining the take-up element in a selected position.

As well known in the art, a speed change operation from a small gear to a larger gear requires an overshift of the derailleur effected by operating the wind-up control device beyond a correct speed change position, which is followed by a return of the control device to the correct speed change position.

With the above known construction, however, the rider must take great care in operating the wind-up control device to the overshift position and then returning the control device to the correct speed change position. This tends to take the rider's attention away from handlebar control and the like, to the detriment of a smooth bicycle run. Further, such an overshift operation needs great skill, which makes it difficult for a beginner in particular to carry out a smooth speed change operation.

SUMMARY OF THE INVENTION

An object of the present invention is to provide a speed control apparatus for a bicycle which allows even a beginner to carry out a smooth speed change operation by reliably effecting a series of overshift operations necessary in changing from a small gear to a larger gear.

In order to achieve the above object, a speed control apparatus for a bicycle according to the present invention is characterized in that the position maintaining mechanism is operable to maintain the take-up element in a plurality of speed change positions and in overshift positions displaced from the speed change positions in a cable winding direction, respectively, and that a position maintenance canceling device is provided which is operable to release the take-up element maintained in position by the position mantaining mechanism, and to limit an amount of rotation of the take-up element in the rewinding direction to one speed change position when the take-up element has been maintained in one overshift position associated therewith, and to a different speed change position in the rewinding direction when the take-up element has been maintained in one speed change position.

With the above construction according to the present invention, the take-up element can be maintained in overshift positions by the position maintaining mechanism.

The position maintenance canceling device release the take-up element maintained in position by the position maintaining mechanism, to allow the take-up element to return in the rewinding direction, and to selectively limit a returning amount of the take-up element to a selected position as follows:

When the position maintenance canceling device is operated with the take-up element maintained in one of the overshift positions, the returning amount is limited to the speed change position associated with this overshift position. Since the take-up element is maintained in that position thereafter, a series of overshift operations may be carried out in a stable and reliable manner. On the other hand, when the position maintenance canceling device is operated with the take-up element maintained in one of the change positions, the take-up element is returned to and maintained in a different speed change position in the rewinding direction, thereby changing from a larger gear to a smaller gear.

Thus, according to the present invention, even a beginner can carry out a return operation from an overshift position reliably and smoothly only by operating the position maintenance canceling device constructed to effect a change from a larger gear to a smaller gear. In the case of a trained rider, less care may be necessary for the return operation from an overshift position, whereby the rider can keep his or her mind on bicycle running with attention concentrated on handlebar control and the like.

Other objects, features and advantages of the present invention will be apparent from the following description of a preferred embodiment.

BRIEF DESCRIPTION OF THE DRAWINGS

FIGS. 1 through 4 show a speed change apparatus for a bicycle according to the present invention, in which:

FIG. 1 is an enlarged partial view in section of the speed control apparatus,

FIG. 2 is a reduced section taken on line 2—2 of FIG. 1,

FIG. 3 is a reduced section taken on line 3—3 of FIG. 1, and

FIG. 4 is a reduced section taken on line 4—4 of FIG. 1

FIGS. 5 through 7 show operative states of a take-up element 21, in which:

FIG. 5 is an explanatory view showing the take-up element in an initial position, FIG. 6 is an explanatory view of the take-up element in an overshift position, and FIG. 7 is an explanatory view showing the take-up element in a selected speed position.

DETAILED DESCRIPTION OF THE PREFERRED EMBODIMENTS

An embodiment of the present invention will be described next with reference to the drawings.

Figure 1:
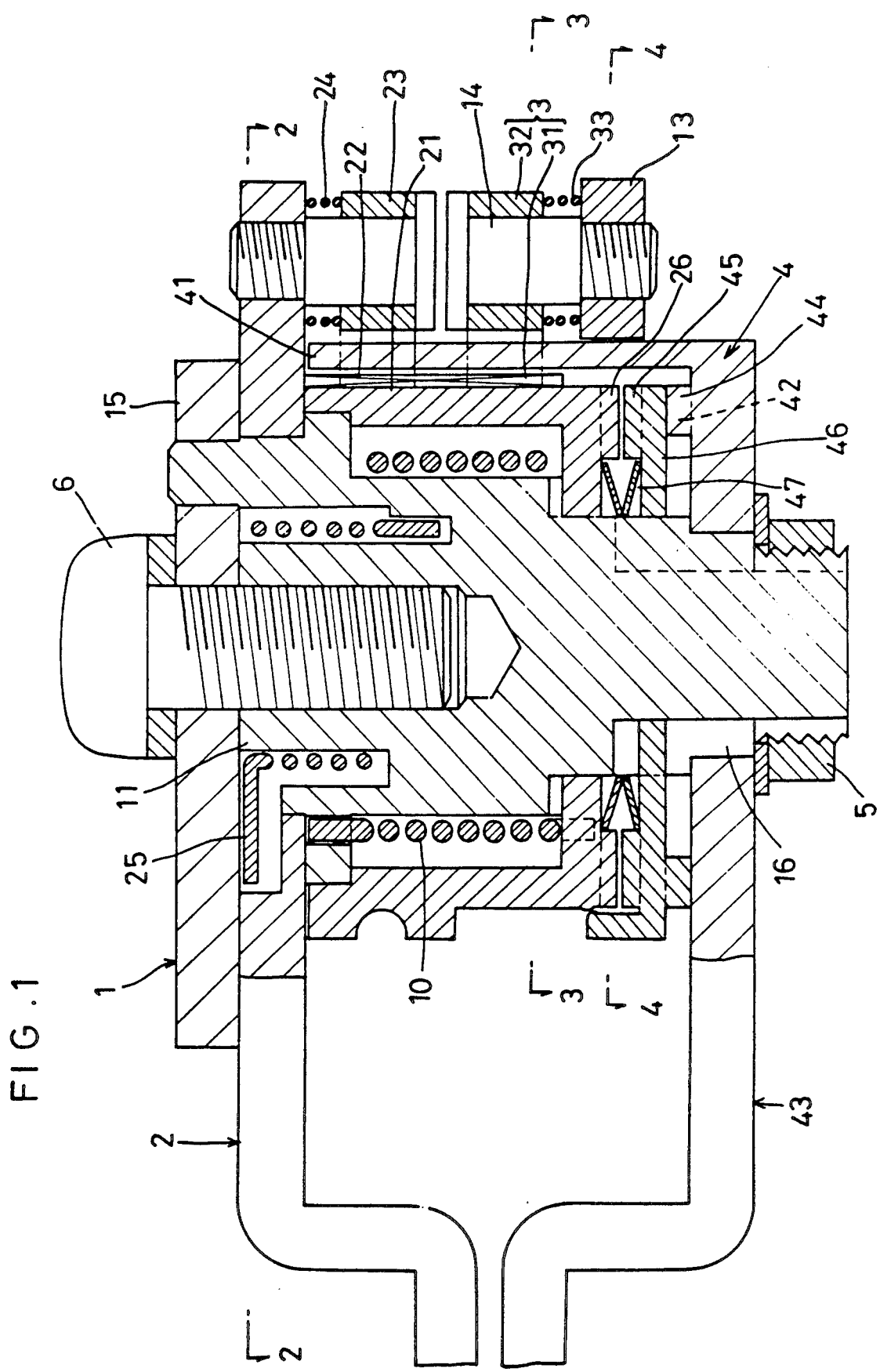

FIG. 1 shows a speed control apparatus for use mainly with a three-speed front derailleur. A fixing member 1 has a base element 15 attached to the handlebar (not shown) of a bicycle and carrying a lever axis 11. The lever axis 11 has a plurality of axial grooves 16 and a screw thread defined peripherally of a forward end portion thereof. The lever axis 11 supports a speed change lever 2 acting as a wind-up control means, a wire take-up element 21, and a release lever 43 and a regulator 46 acting as a position maintaining and releasing means, which are mounted on the lever axis 11 in the mentioned order and retained in position by a nut 5 screwed to the screw thread. This speed control apparatus is mounted adjacent a grip of the handlebar with the lever axis 11 extending downwardly so that the rider can control the speed change lever 2 and release lever 43 with the thumb of his or her hand holding the grip. As described later, the regulator 46 forms part of a rotation limiting mechanism in combination with the take-up element 21. Reference 21a in the drawings denotes a wire hook provided for the take-up element 21 to engage one end of a control wire, and reference 6 denotes a fixing screw.

The take-up element 21 is formed separately from a control portion of the speed change lever 2 and rotatably supported on the lever axis 11. The take-up element 21 defines a plurality of feed teeth 22 arranged at a small pitch around an outer periphery thereof, which feed teeth 22 act as a first engaging portion. The speed change lever 2 pivotally supports a feed pawl 23 acting as a first engaging member to engage the feed teeth 22 for transmitting an operating force acting in a wire winding direction of the speed change lever 2 to the take-up element 21. A spring 24 is mounted between the feed pawl 23 and a pawl axis for constantly urging the feed pawl 23 toward the feed teeth 22. These elements constitute a one-way mechanism. The take-up element 21 has two engaging projections 26 defined with a 180-degee phase difference on one axial end face thereof. A return spring 10 is mounted between the take-up element 21 and lever axis 11 for aiding return of the take-up element 21.

A lever spring 25 is mounted between the speed change lever 2 and lever axis 11 for returning the speed change lever 2 in a wire rewinding direction after a swing operation thereof. A stopper 12 and a contact piece 27 are provided between an axial bore wall of the speed change lever 2 and the lever axis 11 for stopping the speed change lever 2 at an operation initiating position (hereinafter referred to as an original position).

The position maintaining mechanism 3 includes engaging teeth 31 defined on a lower peripheral wall of the take-up element 21 to act as a second engaging portion, and a stopper pawl 32 acting as a second engaging member for engaging the engaging teeth 31 and holding the take-up element 21 against rotation in the wire rewinding direction. The stopper pawl 32 is pivotally supported on a pawl axis 14 extending upwardly and parallel to the lever axis 11 from an upstanding piece 13 provided on the fixing member 1. A pawl spring 33 is mounted between the stopper pawl 32 and upstanding piece 13 for disengaging the pawl 32 from the engaging teeth 31 when the speed change lever 2 is swung in the wire winding direction. These engaging teeth 31 are engageable with the stopper pawl 32 at a smaller pitch than the pitch corresponding to each proper speed stage.

The release lever 43 pivotably supported on the lever axis 11 includes a displacer piece 41 for sweeping aside both the feed pawl 23 and stopper pawl 32, and a cam surface 42 for raising the regulator 46.

Figure 8:
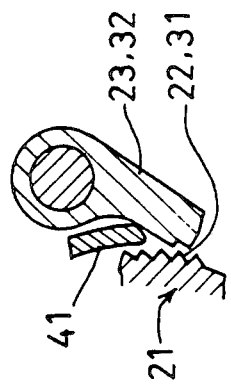
FIG. 8 is an explanatory view showing a pawl in a disengaged position.
Figure 5:
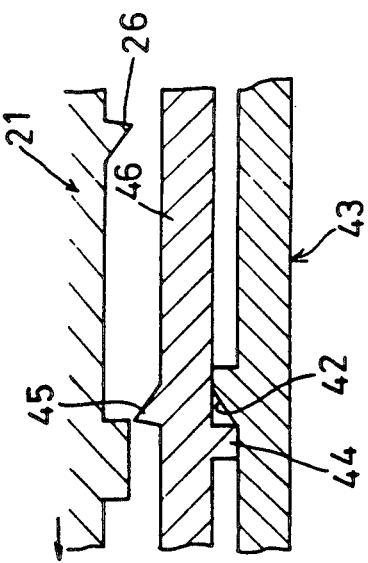

The displacer piece 41 is disposed between the feed pawl 23/stopper pawl 32 and the feed teeth 22/engaging teeth 31. When the release lever 43 is swung in the same direction as rotation of the wire take-up element 21, the displacer piece 41 contacts the feed pawl 23 and stopper pawl 32 and causes these pawls 23 and 32 to pivot away from the teeth 22 and 31 as shown in FIG. 8.

The rotation limiting mechanism includes a presser projection 44 slidable on the cam surface 42, an engaging projection 26 acting as a third engaging portion, and the regulator 46 having a limiting projection 45 acting as a third engaging member engageable with the engaging projection 26. The regulator 46 is supported not to be rotatable but axially movable on the lever axis 11. A spring 47 is mounted between the regulator 46 and take-up element 21 for urging the regulator 46 away from the take-up element 21. Thus, when the release lever 43 is pressed in the wire winding direction, the regulator 46 moves toward the take-up element 21 by means of the cam surface 42 and presser projection 44 to advance the limiting projection 45 into a locus of movement of the engaging projection 26. When the release lever 43 is freed, the spring 47 causes the release lever 43 through the cam surface 42 to return in the wire rewinding direction.

FIGS. 1 through 5 show a low speed state wherein a multistage front gear device is in a small gear or initial position. The speed change lever 2 is urged by the lever spring 25 and stopped at the original position with the contact piece 27 of the speed change lever 2 contacting the abutment 12 of the lever axis 11.

Figure 2:
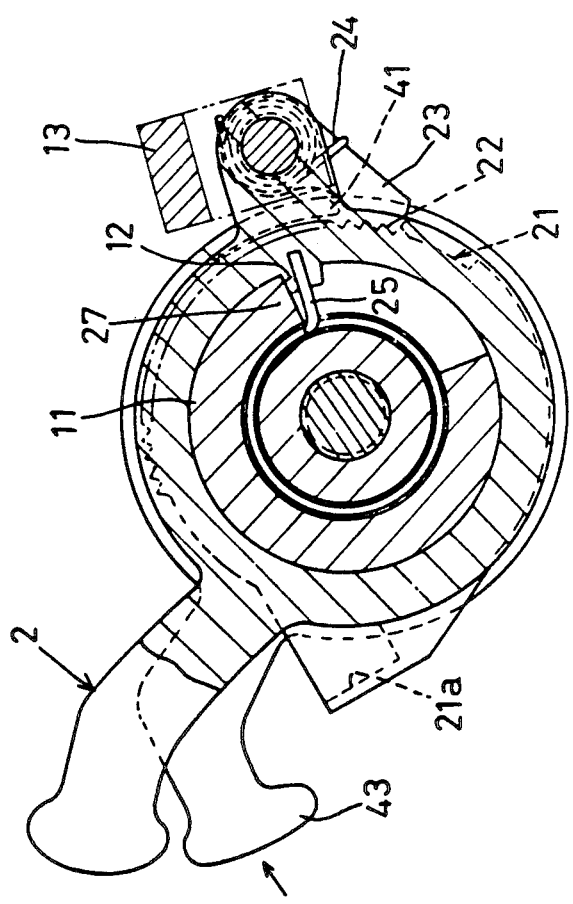
Figure 6:
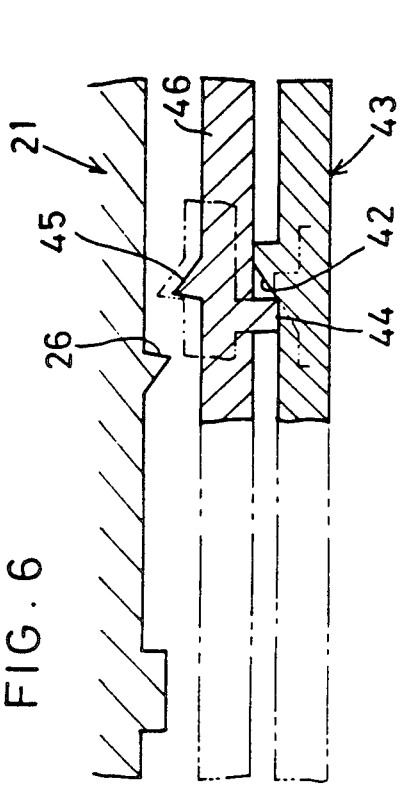

To operate the speed change lever 2 from the initial or original position to a larger gear, the rider may place the thumb of the hand holding the grip on the control portion of the speed change lever 2, and swing the lever 2 an overshift amount exceeding an amount corresponding to one speed change stage in the wire winding direction (clockwise) from the position shown in FIG. 2. Then the operating force of the speed change lever 2 is transmitted to the take-up element 21 through the feed pawl 23 engaged with the feed teeth 22 of the take-up element 21. As a result, the take-up element 21 rotates the overshift amount clockwise, pulling the control wire and overshifting a chain guide of the derailleur to change to an intermediate larger gear. When the speed change lever 2 is released, the stopper pawl 32 engages the engaging teeth 31 of the take-up element 21 thereby to prevent rotation of the take-up element 21 in the wire rewinding direction. Thus the take-up element 21 is positively maintained in the overshift position. The change speed lever 2 returns to the original position (counterclockwise in FIG. 2) under the force of lever spring 25. The speed change lever 2 is stopped at the original position by a contact between the contact piece 27 and abutment 12 as shown in FIG. 2 to be ready for a next operation.

Figure 3:
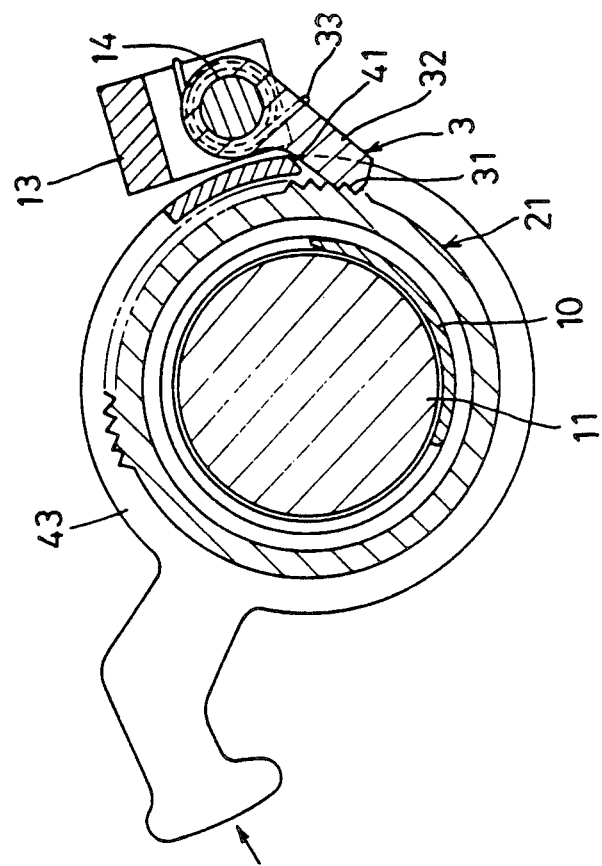
Figure 7:
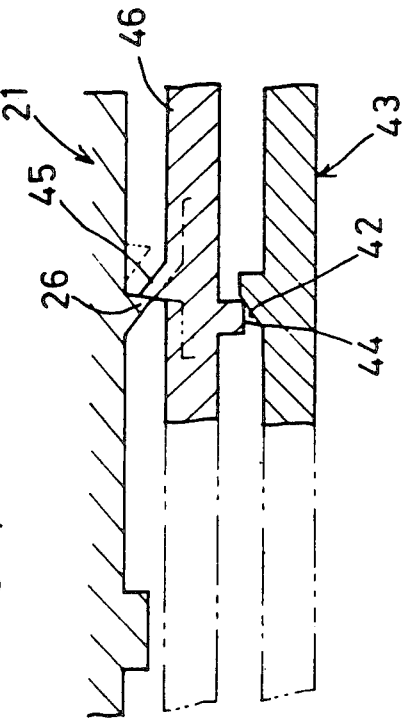
Figure 4:
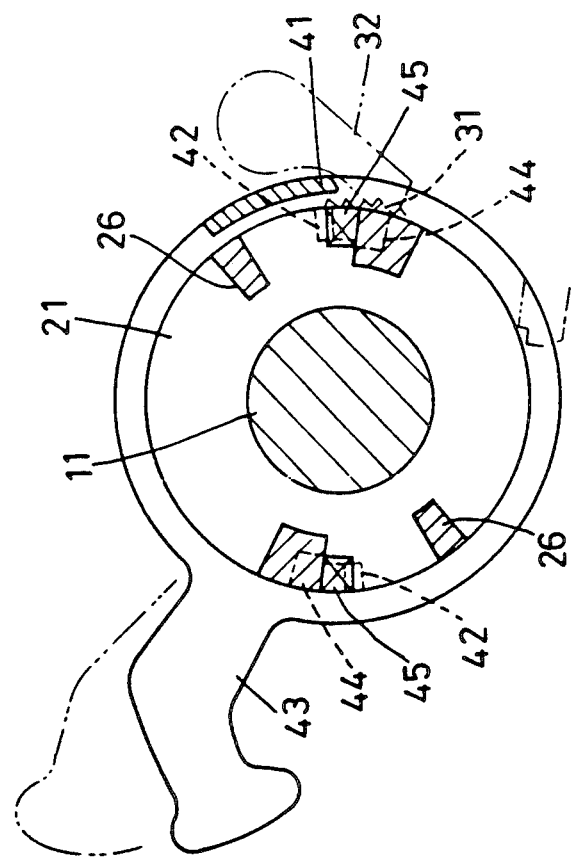

To cancel the overshift after the above speed change operation, the rider may press the release lever 43 with his or her thumb from the position shown in FIGS. 2 and 3 in a direction indicated by arrows in FIGS. 2 and 3. This causes the release lever 43 to slightly pivot clockwise, which in turn causes the regulator 46 through the cam surface 42 to move toward the take-up element 21, thereby advancing the limiting projection 45 into the locus of movement of the engaging projection 26 of the take-up element 21. Subsequently, the displacer piece 41 contacts the feed pawl 23 and stopper pawl 32 and disengages these pawls from the teeth 22 and 31. Since the engaging projection 26 of the take-up elements 21 contacts the limiting projection 45 as shown in FIG. 7, the take-up element 21 under the force of return spring 10 returns an amount less than the pitch of each speed stage in the rewinding direction from the overshift position.

When the release lever 43 is released, the release lever 43 returns under the force of spring 47, whereby the engaging projection 26 disengages from the limiting projection 45. The take-up element 21 makes a slight return rotation under the force of return spring 10 while the pawls 23 and 32 move into engagement with the teeth 22 and 31. The pawls 23 and 32 engage the teeth 22 and 31 with the engaging projection 26 displaced from the limiting projection 45, whereby the take-up element 21 stops at the proper position. The take-up element 21 is then prevented from rotation in the wire rewinding direction and positively maintained at the proper position.

To change from the larger high speed gear back to the small low speed gear, the rider may press the release lever 43 with the thumb in the direction indicated by the arrows in FIGS. 2 and 3. This causes the displacer piece 41 to contact the feed pawl 23 and stopper pawl 32 and disengage these pawls from the teeth 22 and 31. The take-up element 21 under the force of return spring 10 rotates back to the original position from the proper position corresponding to the speed change position. When the release lever 43 is released, the take-up element 21 is positively maintained at the proper position by the same function as in the foregoing instance of overshift cancellation.

A change from the intermediate larger gear to the largest gear may be effected by operating the speed change lever 2 and release lever 43 in the same way as for the change from the small gear to the intermediate gear. The engaging projection 26 may be provided at a plurality of locations corresponding to proper speed change stages, respectively.

Various modifications of the present invention are listed hereunder.

I. In the foregoing embodiment the take-up element 21 is formed separately from the speed change lever 2, but these components may be formed integrally. Then, there is no need for lever spring 25, feed teeth 22 or feed pawl 23.

II. In the foregoing embodiment, the take-up element 21 is returned in the wire rewinding direction by the return spring 10. Alternatively, the return spring of the derailleur may be utilized to return the take-up element 21. Thus, the return spring 10 mounted between the take-up element 21 and fixing member 1 is dispensable.

III. Although the position maintaining mechanism 3 has been described as having the stopper pawl 32 and engaging teeth 31, this mechanism may include a roller and engaging recesses engageable with the roller, instead. In this case, for example, the engaging recesses may be provided on overshift and proper positions of the take-up element 21, with fixing member 1 carrying the roller and a spring for urging the roller toward the recesses.

IV. The maintaining and releasing means 4 may, instead of the release lever 43, comprise a push button construction having a cam surface and operable with an axial push of the lever axis 11 to control the feed pawl 23 and stopper pawl 32.

What is claimed is:

1. A speed control lever apparatus for a bicycle, comprising:

a speed change lever operatively connected to a derailleur through a speed control cable;

wind-up control means for winding up said speed control cable through pivotal movement of said speed change lever in an winding direction, said wind-up control means being urged toward an initial position in a rewinding direction, said rewinding direction being opposite to said winding direction;

position maintaining means for maintaining said wind-up control means in at least first and second speed change positions and first and second overshift regions, said first speed change position being located beyond said initial position in said winding direction, said first overshift region being located beyond said first speed change position in said winding direction, said second speed change position being located beyond said first speed change position in said winding direction, said second overshift region being located beyond said second speed change position in said winding direction; and position maintenance canceling means having a release lever for releasing said wind-up control means for said position maintaining means, for returning said wind-up control means to said first speed change position when said wind-up control means is maintained in said first overshift region, for returning said wind-up control means to said second speed change position when said wind-up control means is maintained in said second overshift region, for returning said wind-up control means to said first speed change position when said wind-up control means is in said second speed change position, and for returning said wind-up control means to said initial position when said wind-up control means is maintained in said first speed change position.

2. A speed control lever apparatus as claimed in claim 1, wherein said wind-up control means includes a pivotal axis and a take-up element which is pivotable about said pivotal axis, and wherein said speed change lever is pivotable about said pivotal axis.

3. A speed control lever apparatus as claimed in claim 2, wherein said position maintaining means includes a limiting member which is axially slidably mounted on said pivotal axis, said limiting member being relatively non-rotatable with respect to said pivotal axis, said apparatus further including third engaging means for providing releasable engagement between said wind-up control means and said limiting member and for releasing said engagement between said wind-up control means and said limiting member in response to operation of said release lever.

4. A speed control apparatus as claimed in claim 3, wherein said third engaging means includes limiting projections and engaging projections, said limiting projections being elements of said limiting member, said engaging projections being elements of said wind-up control means, said engaging elements having a locus of pivotal movement, and said release lever being operable to move each of said limiting projections into said locus of pivotal movement of said engaging projections.

5. A speed control lever apparatus as claimed in claim 2, further including first engaging means for selectively transmitting said pivotal movement of said speed change lever to said wind-up control means.

6. A speed control lever apparatus as claimed in claims 5, wherein said first engaging means includes a one-way clutch for transmitting said pivotal movement of said speed change lever to said wind-up control means only when said speed change lever is moved is said winding direction.

7. A speed control lever apparatus as claimed in claim 5, wherein said position maintaining means includes a pivotal pawl, said apparatus further including second engaging means for selectively interconnecting said pivotal pawl and said wind-up control means.

8. A speed control lever apparatus as claimed in claim 7, wherein said release lever includes a displacer piece for releasing said first and second engaging means.

9. A speed control lever apparatus as claimed in claim 1, wherein said position maintaining means includes a pivotal pawl, said apparatus further including second engaging means for selectively interconnecting said pivotal pawl and said wind-up control means.

10. A speed control lever apparatus as claimed in claim 9, wherein said second engaging means includes a plurality of engaging teeth defined in said wind-up control means corresponding to each speed change position and a pawl element of said pivotal pawl engageable with one of said engaging teeth.

11. A speed control lever apparatus as claimed in claim 10, wherein said plurality of engaging teeth in each speed change position produce a region engageable with said pawl element corresponding to each overshift region.

* * * * *